Figure 1:
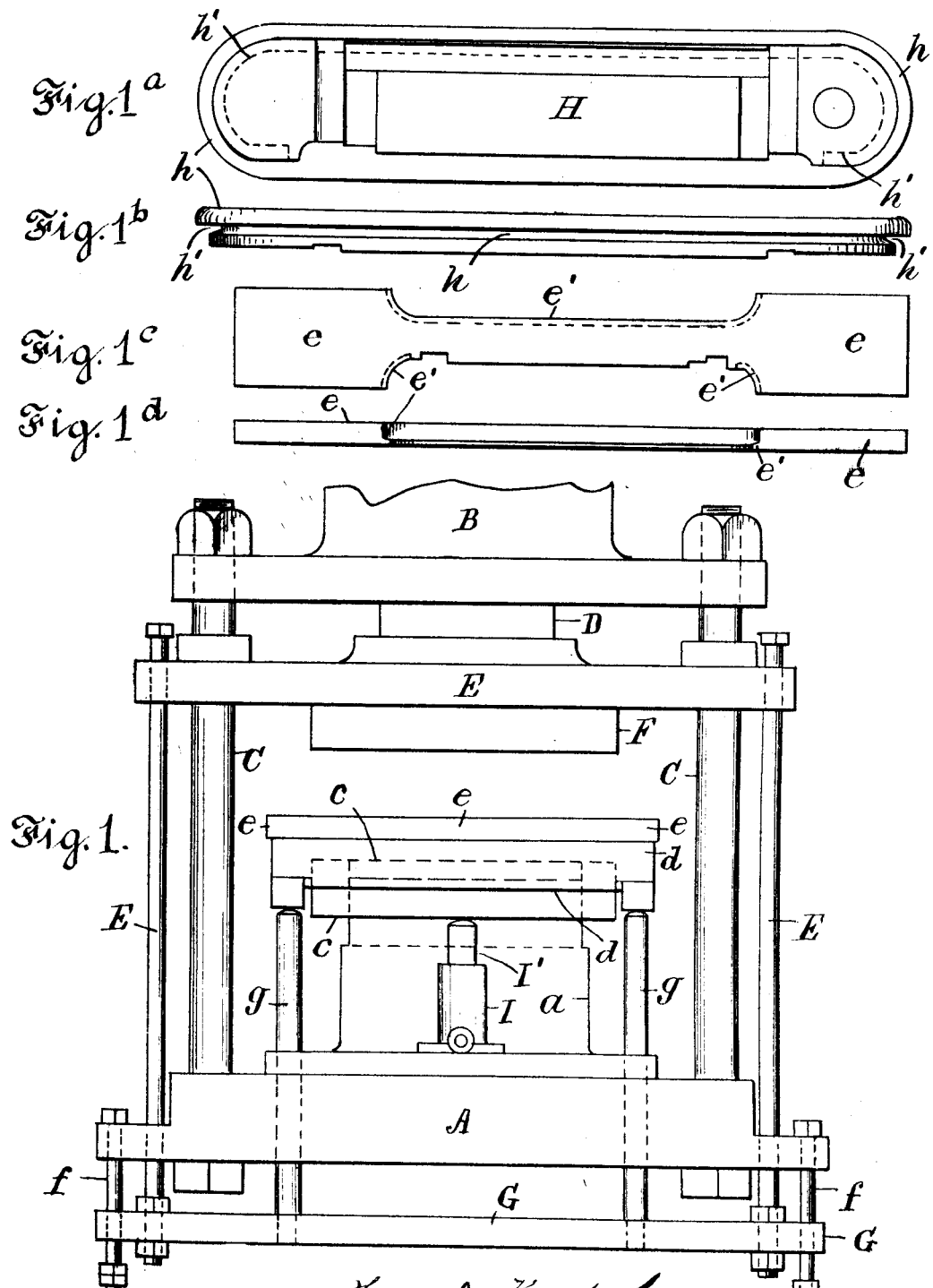

H. J. KASCH.
MOLD FOR PLASTIC MATERIAL.
APPLICATION FILED MAY 10, 1915.

1,182,177.

Patented May 9, 1916.
5 SHEETS—SHEET 1.

H. J. KASCH.
MOLD FOR PLASTIC MATERIAL.
APPLICATION FILED MAY 10, 1915.
1,182,177.
Patented May 9, 1916.
5 SHEETS—SHEET 3.
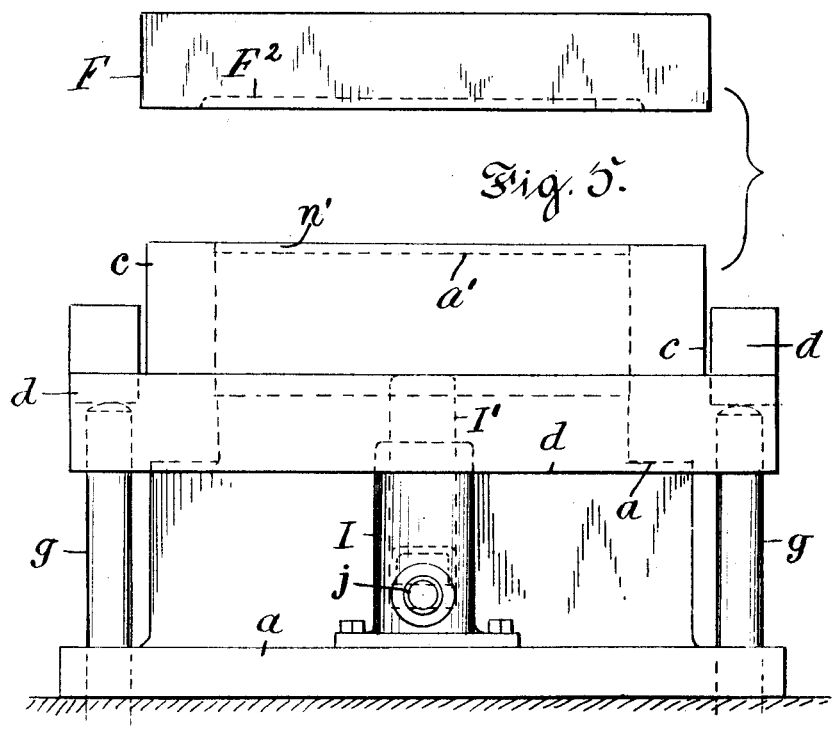
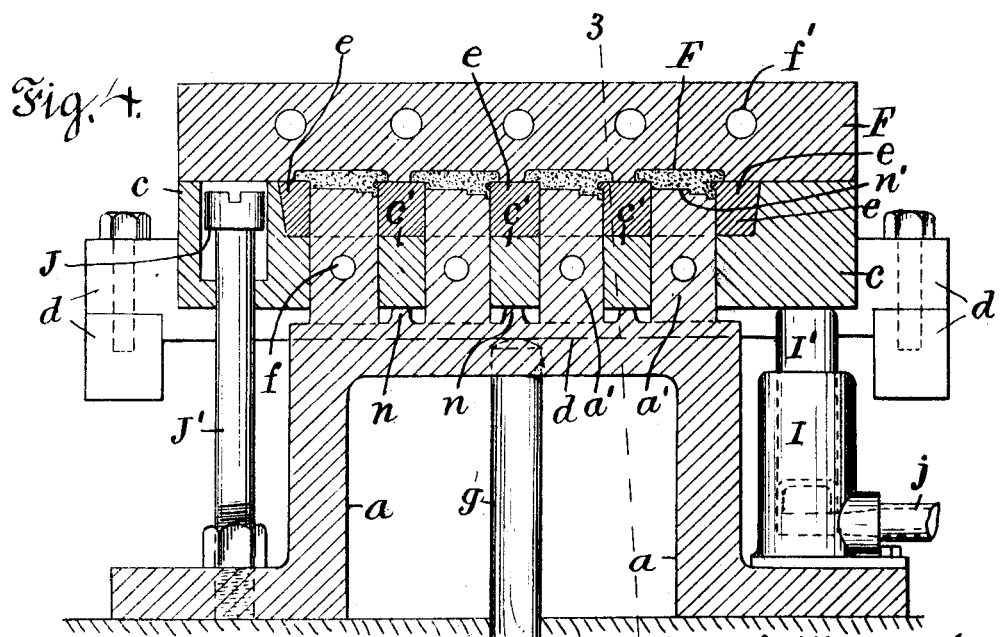
Inventor Henry J. Kasch
per Thomas S. Crane, Atty.

H. J. KASCH.
MOLD FOR PLASTIC MATERIAL.
APPLICATION FILED MAY 10, 1915.
1,182,177.
Patented May 9, 1916.
5 SHEETS—SHEET 4.
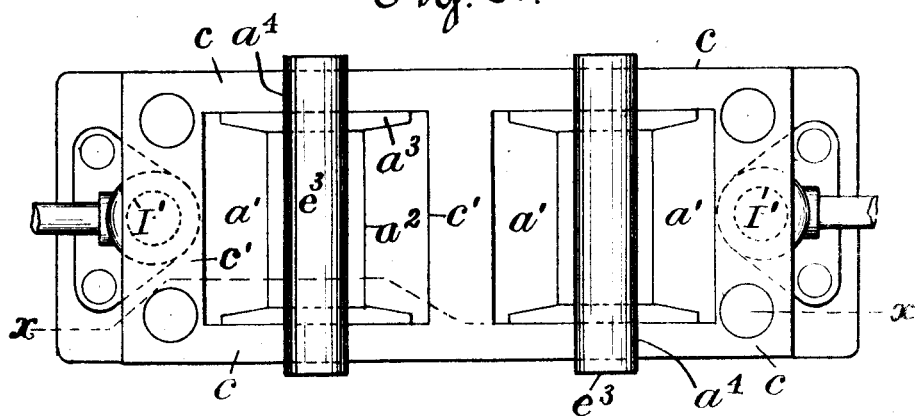
Fig. 6.
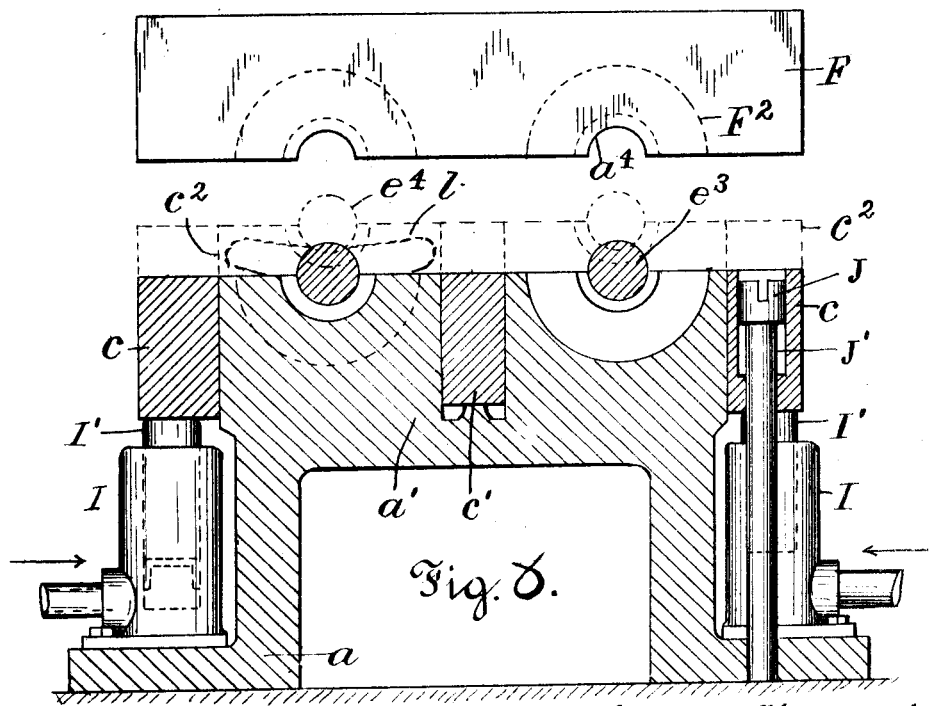
Fig. 7.
Fig. 8.
Inventor Henry J. Kasch, per
Thomas S. Crane, Atty.

H. J. KASCH.
MOLD FOR PLASTIC MATERIAL.
APPLICATION FILED MAY 10, 1915.

1,182,177.

Patented May 9, 1916.
5 SHEETS—SHEET 5.

Inventor Henry J. Kasch, pr
Thos. S. Crane, Atty.

UNITED STATES PATENT OFFICE.

HENRY J. KASCH, OF IRVINGTON, NEW JERSEY, ASSIGNOR TO THE CHARLES BURROUGHS CO., OF NEWARK, NEW JERSEY, A CORPORATION OF NEW JERSEY.

MOLD FOR PLASTIC MATERIAL.

1,182,177.  Specification of Letters Patent.  Patented May 9, 1916.

Application filed May 10, 1915. Serial No. 26,921.

*To all whom it may concern:*

Be it known that I, HENRY J. KASCH, a citizen of the United States, residing at 53 Florence avenue, Irvington, county of Essex, and State of New Jersey, have invented certain new and useful Improvements in Molds for Plastic Material, fully described and represented in the following specification and the accompanying drawings, forming a part of the same.

This invention relates to a press and mold for molding articles of plastic material which require a core or draw-back piece to form a bore or undercut projection upon the molded article.

The mold includes a base having a mold-block projected upwardly therefrom, and a so-called chase snugly embracing such mold-block and movable vertically thereon, and adapted when raised through a limited distance to form a chamber above the mold-block to receive the molding material.

The term "core" will be used herein to include a core-bar like a rod for making a hole through the molded article, or a detachable core-bar having a portion projected into the mold to undercut a portion of the molded product. The molded article will, for convenience, be termed a "product" herein. The core-bar whatever its form, is supported upon the chase so that when the chase is lifted from the mold-block it lifts the molded article therefrom by the engagement of the core-bar therewith.

Where a core-bar carries a portion projecting into the mold, to undercut the product, it requires to be moved laterally to detach it from the product, but is held from lateral movement by the chase during the molding operation, and a frame is provided external to the chase, over which frame the ends of the core-bar or bars project; so that after the chase is raised a limited distance the frame may be raised still farther, so as to lift the core-bars from the chase with the product thereon, which permits the free detachment of the core-bars from the product. Where the core-bars do not form any undercut engagement with the product the lifting-frame is not required, as the lifting of the chase alone suffices to raise the cores from the mold with the molded articles, and this permits the separation of the product from the core at the operator's convenience.

The chase may be pressed normally upward by hydraulic plungers subjected to constant fluid pressure, such upward movement being limited by any suitable stop, and such fluid pressure permitting the chase to be pressed downward yieldingly when the upper die is pressed toward the mold to compress the material therein.

Where core-bars carry projections to undercut the product and a frame is provided to lift the core-bars from the chase, the press in which the mold is operated may have a connection extended from the platen to the lifting-frame, to operate after the pressing die is raised from the mold, to lift the frame and raise the core-bars from the chase.

The invention is shown in two forms herein, one in which the frame is employed, and one without the frame in which only the chase is movable upon the mold-blocks. In both, the chase forms the outer sides of the mold cavity. The illustrations show two forms of the invention, in both of which the movable chase is employed, and raised to lift the core from the mold, and serving also to form a cavity for the reception of the molding material.

Figure 2:
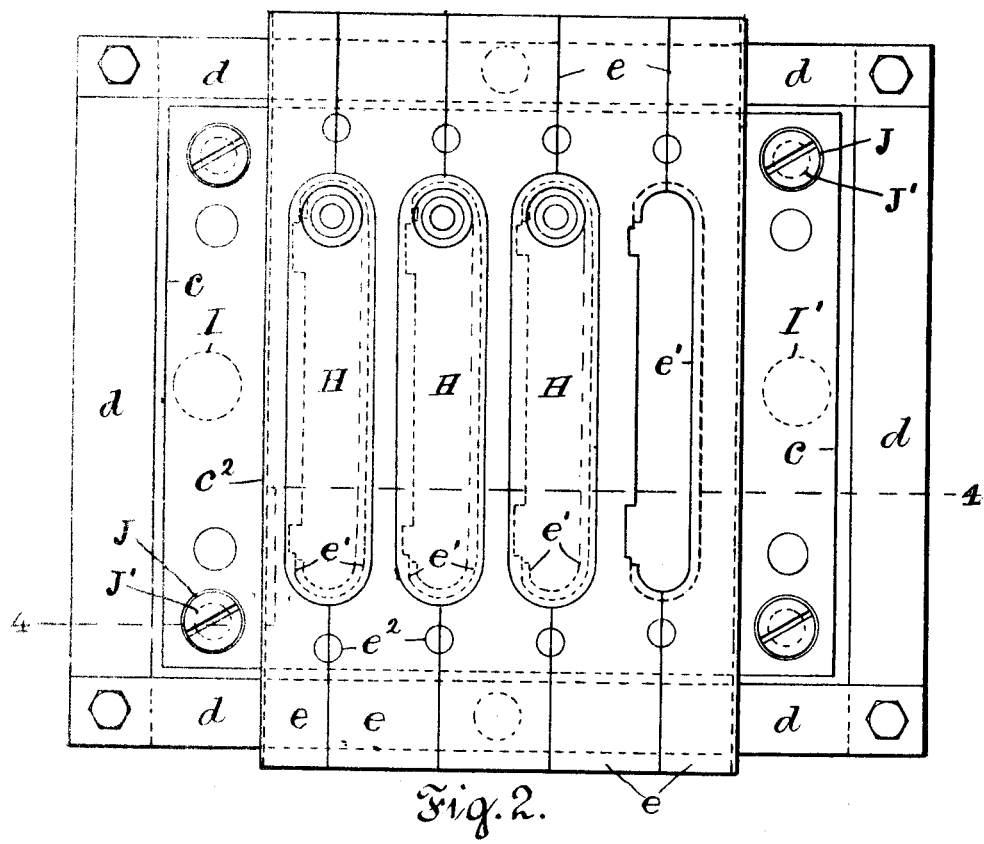
Figure 3:
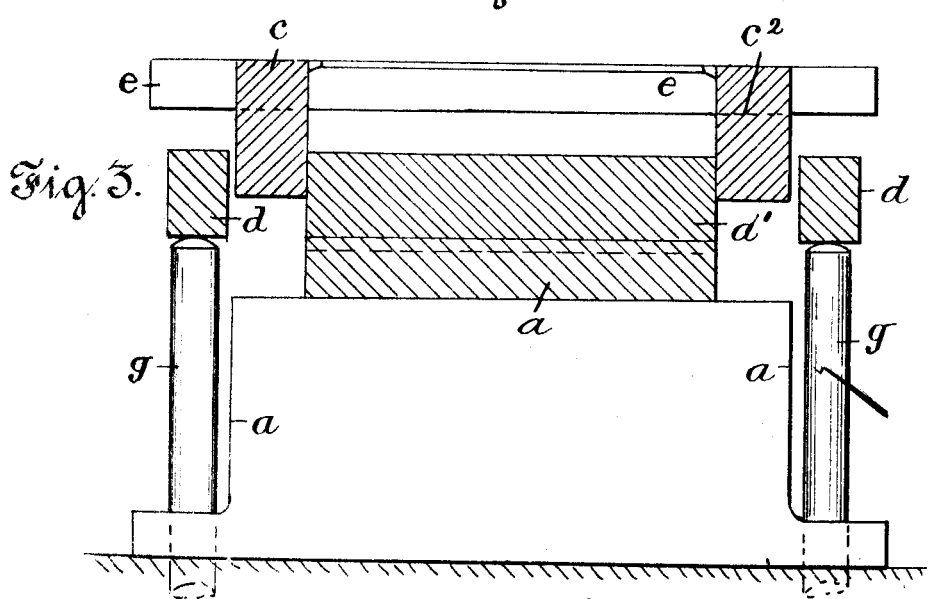
Figure 9:
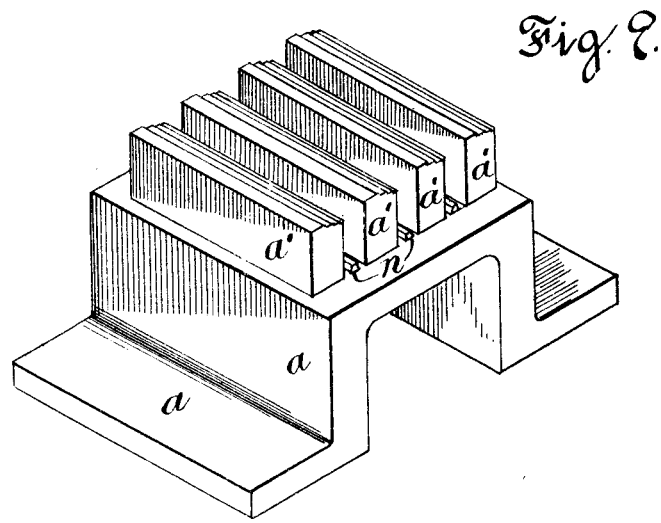
Figure 10:
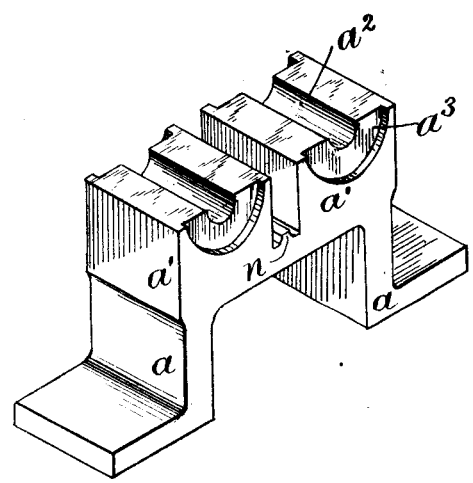

In the drawing, Figure 1 represents a press with connections for operating all the attachments of the mold; Fig. 1ª shows the under side, and Fig. 1ᵇ an edge-view of one of camera head-piece or molded articles upon a larger scale. Fig. 1ᶜ is a plan, and Fig. 1ᵈ an edge-view of one of the core-bars from the mold. Fig. 2 is a plan of a mold adapted to mold four head-pieces for a pocket camera, the border of such pieces having an undercut groove; Fig. 3 is a section on line 3—3 in Fig. 4; Fig. 4 is a vertical section on line 4—4 in Fig. 2; Fig. 5 is an end-view of the mold; Fig. 6 is a plan of a mold for molding two spools, the mold being provided with a movable chase; Fig. 7 is a side-view of the pressing-die for such mold; and Fig. 8 is a section of the said mold in section on line x—x in Fig. 6. Figs. 9 and 10 show the base and mold-blocks in detail.

In Fig. 1, A is a press-bed, B a hydraulic press-cylinder connected thereto by rods C, and D is a hydraulic plunger for moving the platen E toward the bed. A return plunger may be used to lift the platen. The mold is shown with base *a* secured upon the press-bed, chase $c$ movable to and from the base, a lifting-frame $d$ encircling the chase, and lifting-rods $g$ movable through the press-bed beneath the lifting-frame and actuated by a cross-bar G. A die F is attached to the platen for pressing the material in the mold. The downward movement of the cross-bar is limited by bolts $f$ extended through the ends of the press-bed and the cross-bar, and the upward movement of the cross-bar to raise the lifting-frame is effected by rods E extended from the cross-bar through the bed and through the ends of the platen, each having a head or shoulder near its upper end, with which the platen contacts to lift the cross-bar when the platen is raised to open the mold.

In Figs. 2 to 5 inclusive, the base $a$ is shown with four mold-blocks $a'$ projected upward therefrom to mold four similar articles, and having parallel sides to which the body $c$ and cross-bars $c'$ of the chase are fitted snugly but movably. The top of the chase is formed with a transverse recess $c^2$ to admit a series of core-bars $e$ which are notched upon their adjacent edges to fit the mold-blocks $a'$, the same as the other portions of the chase. The ends of the recess $c^2$ embrace the outer sides of the group of core-bars, thus holding them firmly in contact with one another, as shown in Fig. 2. The core-bars are held from end-movement in the recess $c^2$ by dowel-pins $e^2$.

Figs. 1$^a$ and 1$^b$ show the camera head-piece H formed with a flange $h$ around its upper edge, and a groove $h'$ in the body-portion of the head-piece which groove is formed by a rib $e'$ upon each of the core-bars $e$. If the rib $e'$ were formed in the body of the mold it would wholly prevent the extrication of the molded article therefrom, for which reason it is formed upon a core-bar which may be lifted from the mold with the molded article and then freely separated therefrom. Small hydraulic cylinders I are shown set beneath the ends of the chase and provided with plungers I$'$ and with a supply-pipe J through which fluid is constantly supplied under pressure, thus pushing the chase normally upward. Such upward movement is limited by a shoulder J upon a bolt J$'$ attached to the base $a$ at each corner of the chase, and extended upward through the same.

Fig. 3 shows the parts of the mold with the chase lifted, so that the mold-cavities may be charged with material in readiness for the die F to be pressed upon the chase, which forces it downward, and compressing the material between the working-face of the die and the tops of the mold-blocks. Stops $n$ arrest the downward movement to form the desired mold-space $n'$. (See Fig. 4). The plungers yield under such pressing movement, and at its conclusion the parts have the position shown in Fig. 4, with the material wholly molded between the tops of the mold-blocks $a'$ and the mold-cavities F$'$ in the pressing-die. The engagement of the ribs $e'$ upon the core-bars is clearly shown in Fig. 4, and as such rib extends around the ends of the camera head-piece, as indicated by the dotted lines $h'$ in Fig. 1$^a$, it is obvious that the product could not be removed from the mold unless the separable core-bars were provided.

Figs. 6 and 8 show a mold in which the core-bar $e^3$ consists of a round rod adapted to form a hole through the body of a flanged spool. The mold is shown shaped to mold two spools at once, and the top of each mold-block is formed with a cylindrical recess $a^2$ to form the body of the spool and with deeper recesses $a^3$ at the ends of the same to form the flanges.

The chase is formed to embrace the two mold-blocks $a'$, and is formed with notches $a^4$ on a line with the centers of the mold-cavities, to receive core-bars $e^3$. Such a core-bar does not interfere with the lifting of the product directly from the mold, and such lifting is effected by the movement of the chase as shown in Fig. 3; produced when the pressing-die F$'$ of Fig. 7 is retracted from the mold, the chase then rising automatically to the required limit to the position indicated in Fig. 8 by the dotted line $e^2$, thus raising the core-bars and drawing the article out of the mold sufficiently to be removed by hand with such core-bars. The core-bars are afterward forced out of the molded spools.

It will be understood that the cores, before the pressing-die is lowered, lie in the recesses of the chase and are thus lifted above the tops of the mold-blocks when the chase is raised, as indicated by the dotted circles $e^4$ in Fig. 8. As the chase is held thus elevated by the hydraulic plungers I$'$, it is evident that the space inside the chase above the top of the mold-blocks $a'$ is especially suited to receive a blank of the plastic material of suitable bulk to form the molded product. Such a blank is indicated at $l$ in Fig. 8, and the core-bar $e^4$ can be laid in the notches of the chase above such blank, and is pressed downward into it when the pressing-die F is lowered. Owing to the constant pressure of the hydraulic plungers I$'$, the downward movement of the pressing-die is forcibly resisted, and it therefore makes a very tight joint with the upper side of the chase in carrying the same downward, before the die begins to operate upon the blank $l$. The chase is ultimately forced down nearly or quite level with the top of the mold-blocks $a'$, the die F or F$'$ then forcing all the material of the blank $l$ into the mold-cavities, and any escape of such material being absolutely prevented during the molding operation by the portions of the chase which move downward with the die along the top edge of the mold-blocks.

The operation of the chase is precisely the same in both the molds illustrated; in forming a molding chamber, and confining the material to such chamber, during the advance or downward movement of the pressing-die. Great advantage is thus secured by making the mold with a movable chase fitted snugly to and movable upon the mold-blocks a', which are shaped to form the lower side of the product, the upper side being shaped by the mold-cavities F² in the pressing-die F'.

In practice, the mold and pressing-die for molding plastic material are heated during the pressing operation and then cooled before the discharge of the article from the mold, and holes f' are shown in Fig. 4 to indicate the circulation of such heating and cooling fluid; but no connections are shown for supplying such fluid, as they are already well known and form no part of the present invention.

Having thus set forth the nature of the invention what is claimed herein is:

1. In a device for molding plastic material, the combination, with a base having a plurality of parallel bodied mold-blocks projected upwardly therefrom, of a chase snugly embracing all of such mold-blocks and movable vertically thereon, means to limit the movement of the chase, means for raising the chase through such limit, and core-bars extended across the chase and lifted from the mold with the molded article by the raising of the chase.

2. In a device for molding plastic material, the combination, with a base having a plurality of parallel bodied mold-blocks projected upwardly therefrom, of a chase snugly embracing all of such mold-blocks and movable vertically thereon, means to limit the movement of the chase, means for raising the chase through such limit, core-bars extended across and outside of the chase, a frame movable vertically beneath such core-bars, and means for raising the frame to lift the core-bars from the chase.

3. In a device for molding plastic material, the combination, with a base having a plurality of parallel bodied mold-blocks projected upwardly therefrom, of a chase snugly embracing all of such mold-blocks and movable vertically thereon and having a recess adapted to receive a plurality of core-bars, means to limit the movement of the chase, means for raising the chase through such limit, core-bars fitted to the said recess and extended outside of the chase, a frame movable vertically about the chase, and means for raising the frame after the chase is lifted to lift the core-bars from the said recess.

4. In a press and mold for molding plastic material, the combination, with a press-bed, of a platen carrying a pressing-die, a mold having a base with a plurality of parallel bodied mold-blocks projected upwardly therefrom, a chase snugly embracing all of such mold-blocks and movable vertically thereon, and having a recess adapted to receive a plurality of core-bars, means to limit the movement of the chase, means for raising the chase through such limit, core-bars fitted to the said recess and extended outside of the chase, a frame movable vertically beneath the ends of the core-bars, a cross-bar beneath the press-bed with rods extended through the bed to the frame, and means connecting the cross-bar with the platen, operating to lift the frame when the platen raises the pressing-die from the mold, whereby the core-bars are lifted from the mold-blocks by the chase and are, themselves, lifted from the chase by the frame.

In testimony whereof I have hereunto set my hand.

HENRY J. KASCH.